(12) United States Patent
Lösch

(10) Patent No.: US 7,486,950 B2
(45) Date of Patent: Feb. 3, 2009

(54) TELEPHONE MESSAGE FORWARDING METHOD AND DEVICE

(75) Inventor: Kurt Lösch, Stuttgart (DE)

(73) Assignee: Alcatel, Paris (FR)

( * ) Notice: Subject to any disclaimer, the term of this patent is extended or adjusted under 35 U.S.C. 154(b) by 273 days.

(21) Appl. No.: 11/125,163

(22) Filed: May 10, 2005

(65) Prior Publication Data
US 2005/0260994 A1 Nov. 24, 2005

(30) Foreign Application Priority Data
May 19, 2004 (EP) .................. 04360052

(51) Int. Cl.
H04M 3/42 (2006.01)
H04Q 7/20 (2006.01)

(52) U.S. Cl. ............. 455/417; 379/211.02; 379/201.01; 455/414.1; 455/456.1

(58) Field of Classification Search ......... 455/414–417, 455/445, 412.1, 412.2, 569.1, 569.2, 461, 455/456.5; 379/211–212, 201.01, 142.07, 379/259–271
See application file for complete search history.

(56) References Cited

U.S. PATENT DOCUMENTS

| | | | | |
|---|---|---|---|---|
| 6,148,212 | A * | 11/2000 | Park et al. ................. | 455/456.1 |
| 2001/0003706 | A1 | 6/2001 | Buttery et al. | |
| 2002/0111176 | A1 * | 8/2002 | Roeder ........................ | 455/466 |
| 2003/0003900 | A1 * | 1/2003 | Goss et al. ................... | 455/417 |
| 2003/0092451 | A1 * | 5/2003 | Holloway et al. ........... | 455/461 |
| 2005/0064855 | A1 * | 3/2005 | Russell ....................... | 455/417 |

FOREIGN PATENT DOCUMENTS

| WO | WO 97/24004 A | 7/1997 |
|---|---|---|
| WO | WO 02/19750 A | 3/2002 |
| WO | WO 2004/036943 A | 4/2004 |

OTHER PUBLICATIONS

Internet: Howstuffworks, "How Smartphones Work", www.electronics.howstuffworks.com, pp. 1-2.*

* cited by examiner

Primary Examiner—Lester Kincaid
Assistant Examiner—Daniel Lai
(74) Attorney, Agent, or Firm—Sughrue Mion, PLLC

(57) ABSTRACT

This invention relates to a method for forwarding telephone messages to a resident telephone device 10 associated to a telephone number and a resident telephone device. The method is comprising the steps of detecting 12 whether a hand held cellular telephone 8 associated to said resident telephone device 10 is located in a neighboring area of said resident telephone device 10, and activating a telephone message forwarding routine for redirecting incoming telephone messages 30 destined to said cellular telephones to said resident telephone device 10 using said telephone number. The method is used for an automatic handover from a mobile telephone handset to another telecommunication set, preferably a resident mobile telephone device in a car 5 to avoid the use of a hand held cellular phone 8 by a driver 1 of the car 5.

8 Claims, 1 Drawing Sheet

TELEPHONE MESSAGE FORWARDING METHOD AND DEVICE

BACKGROUND OF THE INVENTION

The invention is based on a priority application EP 04 360 052.7 which is hereby incorporated by reference.

This invention relates to a telephone message forwarding method and a resident telephone device. The method is used for an automatic handover from a mobile telephone handset to another telecommunication set, preferably a resident mobile telephone device in a car to avoid the use of a hand held cellular phone by a driver of the car.

In many countries a hand free telephone device is legally requested for using a cellular telephone in a car, meaning any motor vehicle e.g. a passenger car, a bus or a truck, by the driver of the car.

Known hand free telephone devices are specifically designed to be used by a specific type of a cellular telephone. Furthermore, they are adapted to be installed in specific types of cars. Thus, if a person changes his car or his cellular telephone he also has to change the hand free telephone device.

To avoid these problems cars having installed a resident cellular telephone device using an own Subscriber Identity Module (SIM) Card and having associated an own telephone number are known. Therefore, the owner of the car has to pay telephone charges for his cellular telephone and the resident cellular telephone device in his car. Disadvantageously, a caller trying to call said owner has to try twice to reach the owner, in case the owner is driving his car.

Alternatively, there is the possibility to use a double SIM Card. In this case, the cellular telephone has to be switched off when the owner enters his car and to be switched on again when he exits the car, for redirecting incoming calls respectively, which is an inconvenient procedure.

Furthermore, it depends on the owner (user) himself whether he is willing to use the resident cellular telephone device or not. Therefore, the legally requested usage of a hand free device cannot be ensured.

SUMMARY OF THE INVENTION

It is therefore an object of the invention to provide a method for forwarding telephone messages to a resident telephone device and a resident telephone device, which overcome the problems associated with the related art, in particular which disables the use of a hand held cellular phone without using a hand free device while driving a car.

The object concerning the method for forwarding telephone messages to a resident telephone device is attained by the method defined in claim 1 and the object concerning the resident telephone device is attained by the device according to claim 6.

Further advantageous features of the invention are defined in the depending claims.

The inventive method for forwarding telephone messages to a resident telephone device associated to a telephone number is comprising the steps of:
  detecting whether a hand held cellular telephone associated to said resident telephone device is located in a neighbouring area of said resident telephone device, and
  activating a telephone message forwarding routine (call forwarding feature) for redirecting incoming telephone messages (calls) destined to said cellular telephone to said resident telephone device using said telephone number.

The inventive method can be used for avoiding the use of a hand held cellular telephone in a car, if the resident telephone device is a hand free cellular telephone device having associated a cellular telephone number and being installed in a car. The incoming calls directed to the hand held cellular telephone are redirected to the cellular telephone number associated to the resident telephone device in the car, if the presence of the hand held cellular telephone is detected by the resident device, i.e. if the hand held cellular telephone is located in the car.

The inventive method can be used in offices or homes as well as in cars. If a cellular telephone is located in a neighbouring region of a resident telephone device of a fixed telephone network, a DECT telephone or a substation of the resident telephone device, a short message is sent to the operating network of the cellular telephone, comprising a telephone number of the resident telephone device. Thus, incoming calls to the cellular telephone are redirected to the resident telephone device as long as the cellular telephone is located in the neighbouring region of the resident telephone device. In consequence, the operating network of the cellular telephone is released, what is an advantage especially in metropolitan areas. Furthermore, operating costs for the caller are decreased and the quality of transmission, e.g. of speech, is increased because of the fact that speech is transmitted without packing in fixed telephone networks.

The inventive method can be applied to all kinds of internet telephoning, e.g. Voice over Internet Protocol (VoIP) or Session Initiation Protocol (SIP). In this case, also Short Messages (SMS) can be received by a computer used as a resident telephone device performing internet telephoning.

The inventive method results at least in the following advantages:
  The method is highly reliable, because a user of the inventive method needs not to take any action himself. The steps of the inventive method are performed automatically by a respective telephone system;
  The inventive method offers supplementary income for providers of cellular telephone networks;
  The inventive method is a secure method to avoid using a cellular telephone without a hand free device in a car by the driver of the car;
  The inventive method works without taking special actions by a user of the method, e.g. a driver of a car;
  The inventive method is easy to be implemented, with only very little costs for hard- and software of a car and base stations of cellular telephone networks;
  If the inventive method is being used in a car, only one supplementary cellular telephone number has to be provided. This telephone number never needs to be available simultaneously with the telephone number of the cellular telephone associated to the resident telephone device being installed in the car.

Preferably, said detecting is comprising the step of analysing signals being exchanged between a base station of an operating cellular telephone network of said cellular telephone and said cellular telephone by said resident telephone device.

Analysing signals being exchanged between the base station of the operating cellular telephone network of the cellular telephone and the cellular telephone itself is the most appropriate method to be implemented, because no additional hardware installations need to be done. The existing antenna of the car can be used to receive the signals to be analysed.

Advantageously, said activating is comprising the step of setting up a forwarding message comprising said telephone number of said resident device to an operating cellular telephone network of said cellular telephone, preferably by said resident telephone device. Therefore, the operating cellular telephone network gets the information, which is necessary to redirect the incoming calls to the right destination.

Very advantageously, said detecting is repeated after predefined time intervals and said telephone message forwarding routine is deactivated if said cellular telephone is located outside said neighbouring area. If the message forwarding routine is deactivated if said cellular telephone is located outside said neighbouring area, the user of the cellular phone is able to receive incoming calls, when he has left the area of the resident telephone device. No further action needs to be done by the user, because his leaving is detected automatically.

It is preferred to use the inventive method in a car to avoid the usage of a hand held cellular telephone by the driver of the car. Therefore, said redirecting is being done to a hand free cellular telephone device in said car as said resident telephone device.

An inventive resident telephone device, being designed to be associated to a telephone number, is comprising:
  detecting means, being designed to detect whether a hand held cellular telephone associated to said resident telephone device is located in a neighbouring area of said resident telephone device,
  activating means, being designed to activate a telephone message forwarding routine for redirecting incoming telephone messages destined to said cellular telephone to said resident telephone device using said telephone number.

The inventive resident telephone device is designed to perform the steps of the inventive method. Therefore, it makes available the advantages being provided by the inventive method.

In a very preferred embodiment of the invention, said resident telephone device is a hand free cellular telephone device, being designed to be installed in a car and/or said activating means are being designed to set up a forwarding message comprising said telephone number of said resident device to an operating cellular telephone network of said cellular telephone. This embodiment enables the avoidance of the usage of a hand held cellular telephone by the driver of a car.

Preferably, said detecting means are comprising analysing means, being designed to analyse signals being exchanged between a base station of an operating cellular telephone network of said cellular telephone and said cellular telephone. Said analysing means may be implemented as a microprocessor loaded with software comprising code sections by which the analysis is performed. Therefore, no additional hardware has to be provided to detect the cellular telephone.

Preferably, said resident telephone device is comprising a micro processor, loaded with a computer program with software code sections by which the steps according to the inventive method are carried out.

A telephone system according to the invention is comprising a hand held cellular telephone and an inventive resident telephone device.

The different features of the preferred embodiments of the invention may be used in combination together with the invention as set forth in the independent claims or just each single preferred embodiment together with the invention as set forth in the independent claims.

BRIEF DESCRIPTION OF THE DRAWINGS

The embodiments of the invention will now be described with reference to the accompanying drawing.

Figure 1:
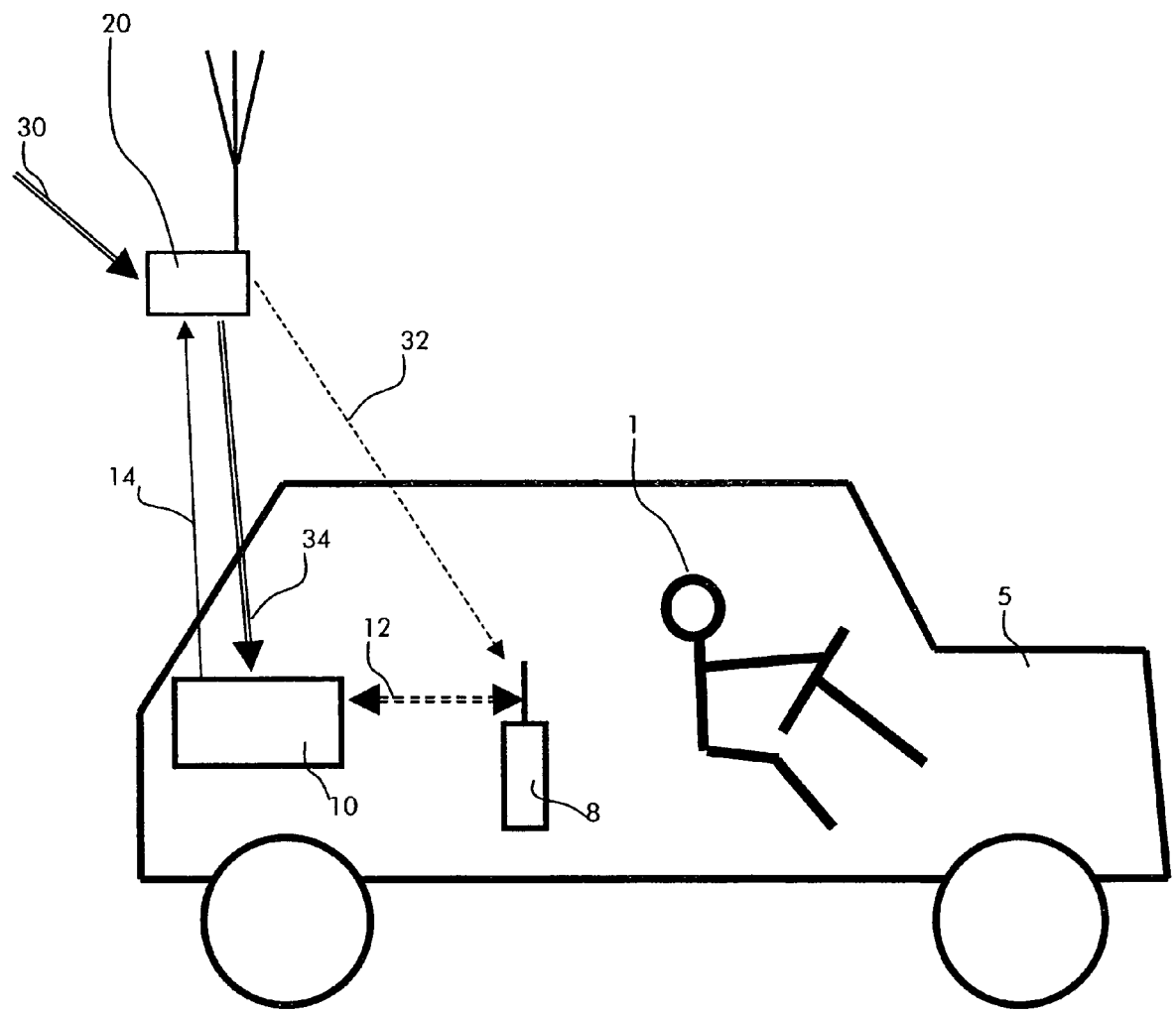
In FIG. 1 the inventive method is shown schematically. The inventive method is used while a driver 1 is driving a car 5. The method avoids the usage of a hand held cellular telephone 8 while the driver is sitting in the car 5, i.e. while the hand held cellular telephone 8 is located in a neighboring region of a resident telephone device 10 installed in the car 5. The resident telephone device 10 detects 12 whether the cellular telephone is located in the car. After detecting the cellular telephone 8, the resident telephone device sends a message 14 to a base station 20 of the operating cellular telephone network of the cellular telephone. According to said message 14, a telephone message forwarding routine is activated in the base station 20 to redirect incoming telephone messages 30, normally destined to said cellular telephone, illustrated with the dotted arrow 32, to the resident telephone device 10. The redirection 34 of the incoming calls 30 is accomplished by forwarding the incoming calls 30 to a telephone number associated to the resident telephone device 10.

The basic idea of the inventive method is to have installed a resident mobile cellular telephone device 10 in the car 5. The resident mobile cellular telephone device detects the presence of a hand held mobile phone in the car and sends a call forwarding request to a base station of the cellular telephone network. All calls destined to the hand held mobile phone in the car are redirected to the resident cellular phone by the cellular telephone network, i.e. its base stations, according to said request. The device recognises if a user, meaning the driver 1 of the car 5, carrying a cellular telephone 8 with him, enters the car 5. After recognising the cellular telephone, the device 10 sends a signal (message 14) to the base station 20. The signal is comprising the message that incoming calls to the cellular telephone 8, i.e. calls destined to the telephone number of the cellular telephone, have to be redirected to the resident mobile phone device 10.

The detection of the presence of the cellular telephone can be carried out according to various methods. For example:
  analysing signals being exchanged between the base station of the operating cellular telephone network of the cellular telephone and the cellular telephone itself, e.g. synchronizing pulses;
  electronic contact, e.g. to a loading device of the cellular telephone;
  Infra red contact
  Bluetooth communication
  Inductively, e.g. by laying down the cellular telephone at a specific place having a sensor device;
  communicating with an electronic label being fixed on the cellular telephone, like an anti-theft device in a department store;
  Analysing signals being exchanged between the base station of the operating cellular telephone network of the cellular telephone and the cellular telephone itself is the most appropriate method to be implemented, because no additional hardware installations are to be done. The existing antenna of the car can be used to receive the synchronizing pulses.

The presence of the cellular telephone is to be repeated after defined time intervals, for example every 10 seconds. Therefore, the resident mobile phone device recognises if the user has left the car with the cellular phone and sends a respective signal to the base station, comprising the message that the redirection of incoming calls has to be cancelled. According to the described method, the user does not need to initiate any switching actions. It can be prevented that the user takes a call without using a hand free device being part of the resident mobile phone device.

To avoid that incoming calls to other cellular telephones, e.g. carried by passengers who are not the driver of the car and who are allowed to use their cellular phones without using a hand free device, are redirected to the resident mobile phone device, settings of the resident mobile phone device have to be arranged before the inventive method can be performed. These settings are including an association of the cellular telephone of the driver to the resident mobile phone device. The settings can be arranged in several ways, e.g. by pressing a single button of the resident mobile phone device or by calling the telephone number associated to the resident mobile phone device by the cellular telephone.

The resident mobile phone device is comprising a cellular telephone electronics, not necessarily a keypad and a display. The device could be implemented as a part of a car radio or the car on board electronics. A software is being loaded into a microprocessor of a mobile phone device in a car comprising code sections by which the steps of detecting whether a hand held cellular telephone associated to the resident mobile phone device is located in a neighbouring region of the device, i.e. in the car, and setting up a message to the base station, according to which the redirection of the incoming calls is performed. If the existing standard feature of redirecting telephone calls of in the base station is used, no hard- and/or software modification of the base station is necessary. Modifications of the existing hard- and/or software could increase comfort and reliability of the system.

The inventive telephone system, comprising an inventive resident mobile phone device and a cellular telephone additionally can be used for several functions, e.g.:

Using the cellular phone as an ignition key of the car and/or as an anti-theft device, in addition or alternatively to a known electronic key of a car;

Remotely controlling an independent vehicle heater;

Localizing a car having installed an inventive resident mobile phone device, e.g. on big parking lots or parking garages;

This invention relates to a method for forwarding telephone messages to a resident telephone device associated to a telephone number and a resident telephone device. The method is comprising the steps of detecting whether a hand held cellular telephone associated to said resident telephone device is located in a neighbouring area of said resident telephone device, and activating a telephone message forwarding routine for redirecting incoming telephone messages destined to said cellular telephone to said resident telephone device using said telephone number. The method is used for an automatic handover from a mobile telephone handset to another telecommunication set, preferably a resident mobile telephone device in a car to avoid the use of a hand held cellular phone by a driver of the car.

The invention claimed is:

1. A method for forwarding telephone messages to a resident telephone device associated with a telephone number, comprising:

said resident telephone device detecting whether a hand held cellular telephone associated with said resident telephone device is located in a neighbouring area of said resident telephone device, and activating a telephone message forwarding routine for redirecting incoming telephone messages destined to said cellular telephone to said resident telephone device using said telephone number of said resident telephone device, wherein said activating comprises setting up a forwarding message comprising said telephone number of said resident telephone device to an operating cellular telephone network of said cellular telephone, via said resident telephone device, and only said resident telephone device is modified to implement said method, and wherein said redirecting is being done to a hand free cellular telephone device in a car as said resident telephone device, and said detecting is done by an existing antenna of said car.

2. The method according to claim 1, wherein said detecting comprises analysing signals being exchanged between a base station of an operating cellular telephone network of said cellular telephone and said cellular telephone by said resident telephone device, and wherein no modification of hardware and software of said base station is required to implement said method, and no hardware modification of said resident telephone device is required to implement said method.

3. The method according to claim 1, wherein said detecting is repeated after predefined time intervals, and said telephone message forwarding routine is deactivated if said cellular telephone is located outside said neighbouring area.

4. A resident telephone device that is associated with a telephone number, comprising:

means, for said resident telephone device detecting whether a hand held cellular telephone associated with said resident telephone device is located in a neighbouring area of said resident telephone device, means for activating, via said resident telephone device, a telephone message forwarding routine for redirecting incoming telephone messages destined to said cellular telephone to said resident telephone device using said telephone number, wherein said means for detecting comprises means for analysing signals being exchanged between a base station of an operating cellular telephone network of said cellular telephone and said cellular telephone, via said resident telephone device, and wherein hardware and software of said base station is not modified, and no hardware modification of said resident telephone device is required, and wherein said resident telephone device is a hand free cellular telephone device, installed in a car and/or said means for activating sets up a forwarding message comprising said telephone number of said resident telephone device to an operating cellular telephone network of said cellular telephone, wherein said means for detecting includes an existing antenna of said car.

5. A resident telephone device, wherein said resident telephone device comprises a micro processor, loaded with a computer program with software code sections by which the steps according to the method according to claim 1 are carried out.

6. A telephone system, comprising a hand held cellular telephone and a resident telephone device according to claim 5.

7. The method of claim 1, wherein said cellular telephone controls at least one of (a) an ignition key of a car, (b) an antitheft device, (c) an independent vehicle heater, and (d) locating a car in a parking facility.

8. The method of claim 1, wherein a user of said cellular phone is one of a driver and a passenger of a vehicle.

* * * * *